(12) United States Patent
Nakayama et al.

(10) Patent No.: US 6,386,927 B2
(45) Date of Patent: *May 14, 2002

(54) SCREW FASTENING STRUCTURE AND NUT MEMBER

(75) Inventors: Ryoichi Nakayama, Ibaraki-ken; Shinji Nakano, Osaka-fu, both of (JP)

(73) Assignees: Nissan Motor Co., Ltd., Kanagawa-Ken; Fuse Rashi Co., Ltd., Osaka-Fu, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,365

(22) Filed: May 13, 1999

(30) Foreign Application Priority Data

May 13, 1998 (JP) .............................. 10-129926

(51) Int. Cl.⁷ .................................. H01C 4/30
(52) U.S. Cl. ....................... 439/801; 411/310
(58) Field of Search .................. 439/801; 411/428, 411/171, 181, 902, 903, 437, 309, 310, 311

(56) References Cited

U.S. PATENT DOCUMENTS

| 3,517,717 | A |   | 6/1970  | Orlomoski |         |
|-----------|---|---|---------|-----------|---------|
| 4,252,168 | A |   | 2/1981  | Capuano   |         |
| 4,826,377 | A |   | 5/1989  | Holmes    |         |
| 5,221,170 | A | * | 6/1993  | Duffy     | 411/428 |
| 5,663,015 | A | * | 9/1997  | Hooke     | 429/181 |
| 5,672,037 | A |   | 9/1997  | Iwata     |         |
| 5,685,680 | A | * | 11/1997 | Duffy     | 411/171 |
| 5,944,465 | A | * | 8/1999  | Janitzki  | 411/310 |

FOREIGN PATENT DOCUMENTS

| FR | 2 311 215  | 5/1975 |
| GB | 1 312 189  | 4/1973 |
| JP | 57-147410  | 9/1982 |
| JP | 6-210218   | 8/1994 |

* cited by examiner

Primary Examiner—Tho Dac Ta
Assistant Examiner—Phuong Nguyen
(74) Attorney, Agent, or Firm—McDermott, Will & Emery

(57) ABSTRACT

A conductive male thread (22) has a thrust bearing flank (22a) coated with an insulating paint layer (23), and a conductive female thread (12) has a thrust bearing flank (12a) formed with a conductive projection (13) to break through the paint layer (23) and bite in that flank (22a).

15 Claims, 4 Drawing Sheets

SCREW FASTENING STRUCTURE AND NUT MEMBER

BACKGROUND OF THE INVENTION

The present invention relates to a screw fastening structure and a nut member, and in particular, to a screw fastening structure of the type that includes a male thread and a female thread to be electrically connected to each other, and a nut member of the type that has a female thread constituting a circuit element to be electrically connected to a mating male thread.

In application to a grounding of a vehicle body, such a type of screw fastening structure as well as such a type of nut member tends to suffer an insulating paint coat that covers a male thread, thus intervening between the male thread and a mating female thread.

As a countermeasure, there has been proposed a paint removing groove defining a thread profile as an edge for removing a paint layer, as disclosed in Japanese Utility Model Publication No. 57-147410.

SUMMARY OF THE INVENTION

However, in the field of vehicle in which the painting is always improved, the provision of a paint removing groove sometimes fails to insure a neat removal of an intervening paint layer, resulting in remaining pieces of paint as electrical insulator pressed between male and female threads screwed under strong thrust. Such paint pieces may cause a non-conformity in current conduction between the screwed threads.

The present invention has been achieved with such points in view.

It therefore is an object of the invention to provide a screw fastening structure and a nut member, permitting a female thread to be electrically connected to a mating male thread covered with an insulating paint coat, with a secured current conduction through the paint coat.

To achieve the object, an aspect of the invention provides a screw fastening structure comprising a conductive male thread having a first flank covered with an insulating paint coat, a conductive female thread having a second flank, and an electric contact interconnecting the first and second flanks through the paint coat.

According to this aspect, the second flank of the conductive female thread is electrically connected to the first flank of the conductive male flank, by the electric contact interconnecting them through the paint coat, permitting a secured current conduction.

The electric contact may preferably comprise a conductive projection formed on the second flank.

Further to achieve the object, another aspect of the invention provides a nut member comprising a conductive female thread having a flank, and a conductive projection formed on the flank.

Preferably, the nut member may further comprise a substantially straight nut body formed with the female thread and provided with a polarity identifier for identifying a polarity in orientation of the projection.

BRIEF DESCRIPTION OF THE ACCOMPANYING DRAWINGS

Figure 1A:
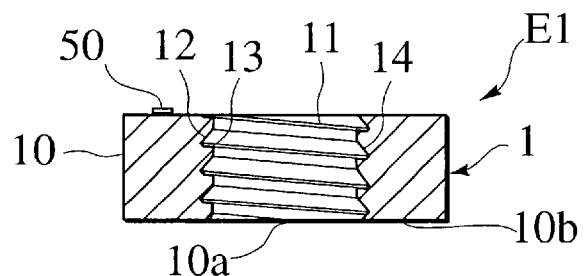
Figure 1B:
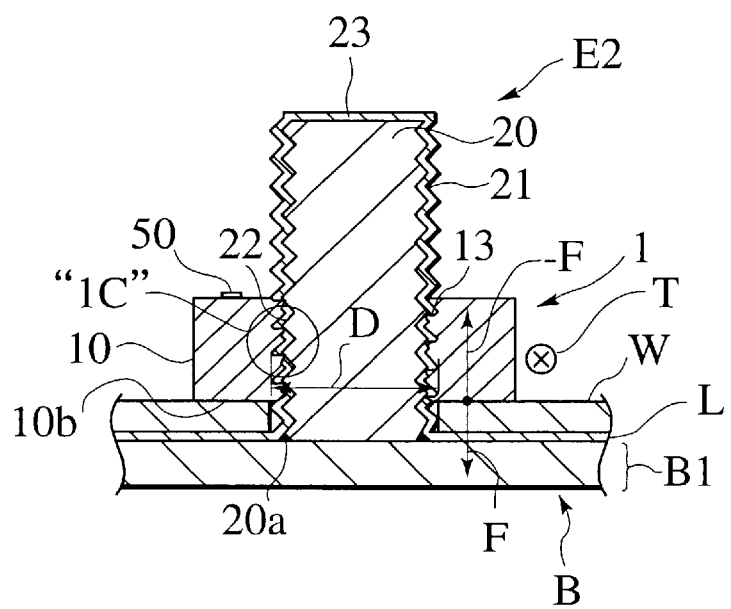
Figure 1C:
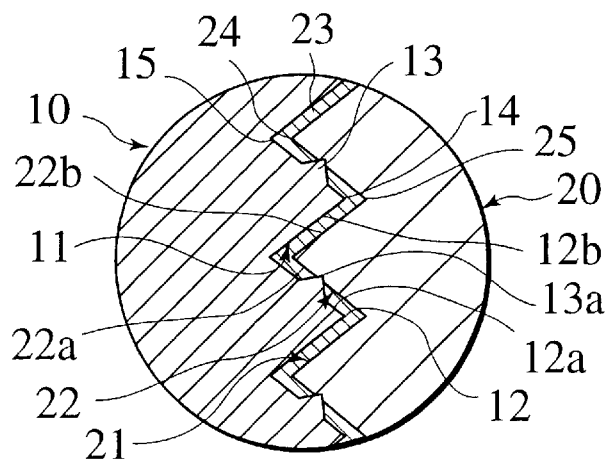
Figure 2A:
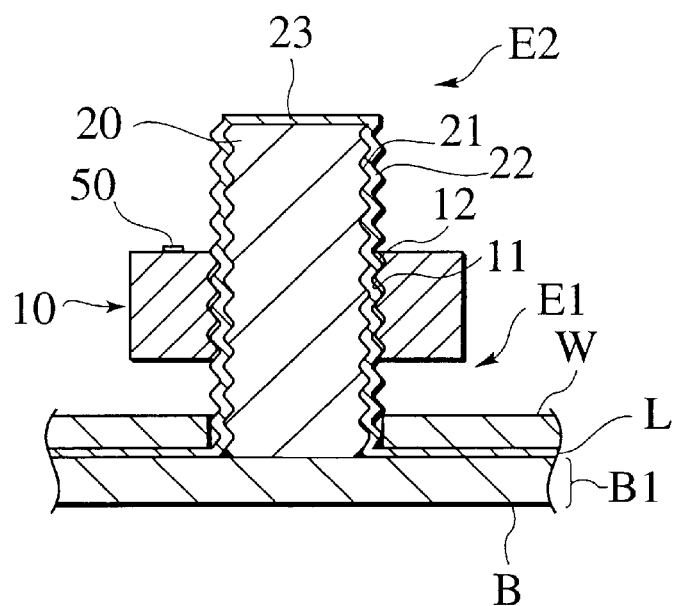
Figure 2B:
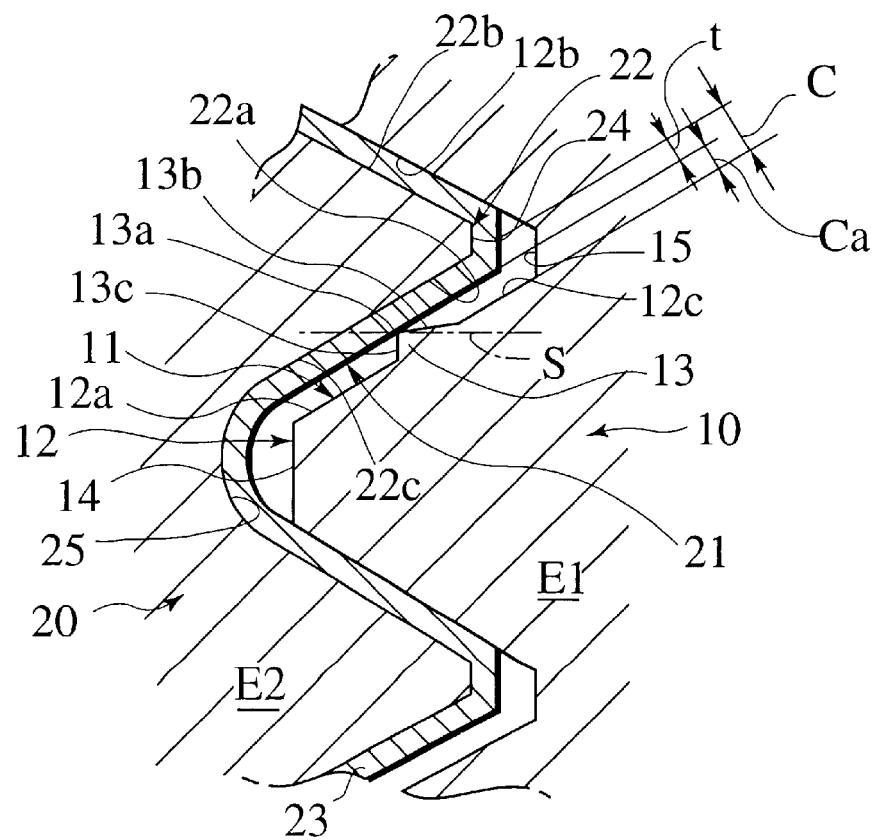
Figure 3A:
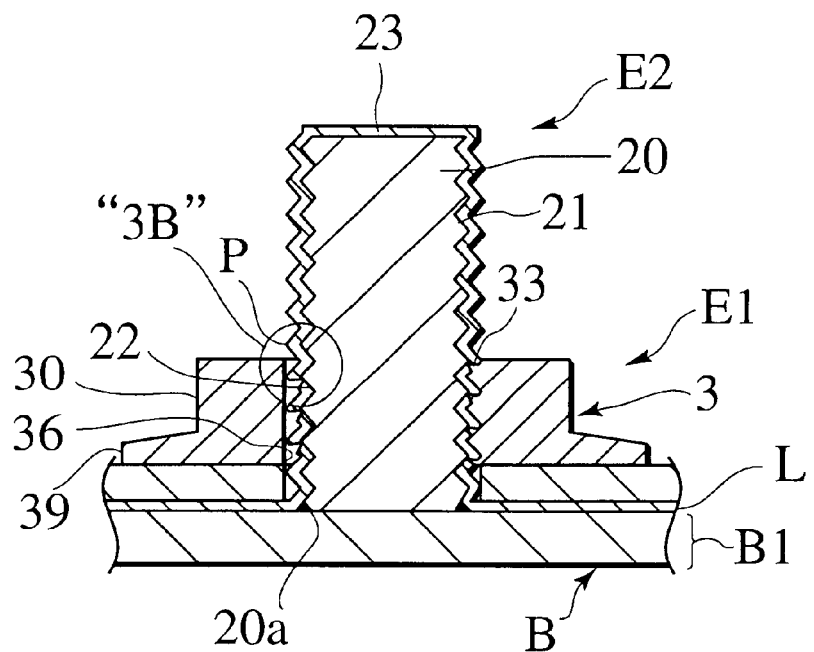
Figure 3B:
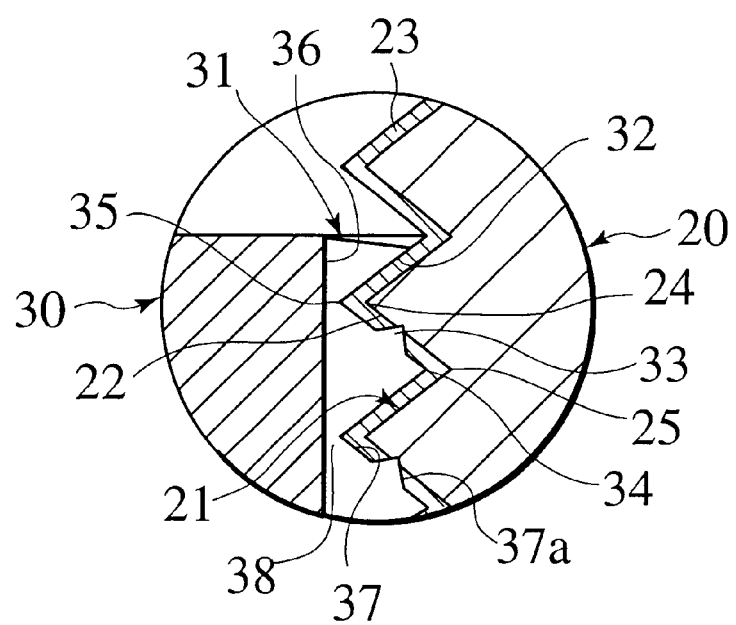
Figure 4A:
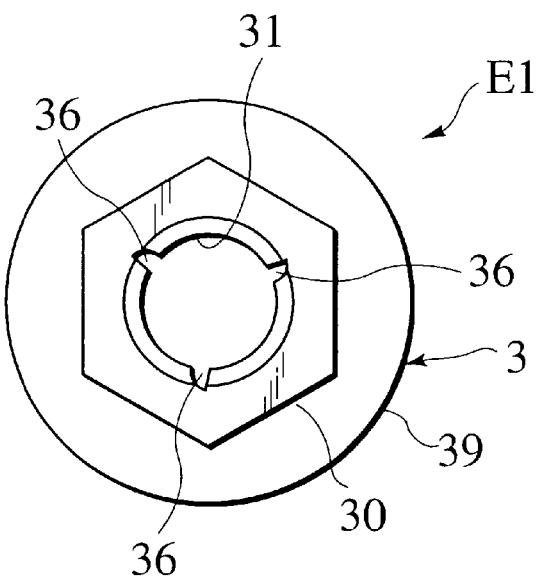
Figure 4B:
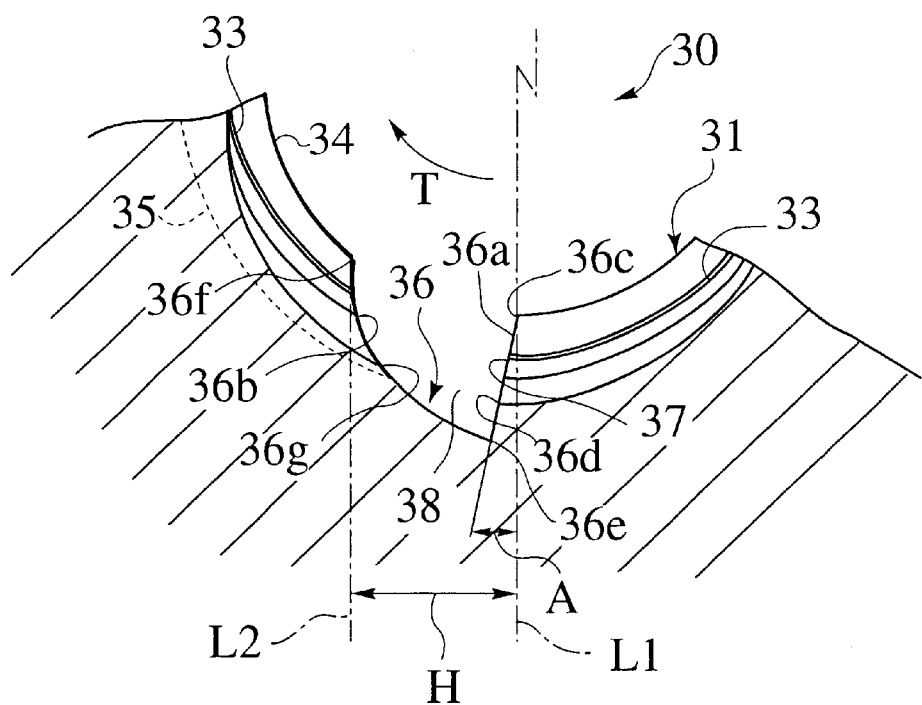

The above and further objects and novel features of the present invention will more fully appear from the following detailed description when the same is read in conjunction with the accompanying drawings, wherein:

FIGS. 1A, 1B, and 1C illustrate a screw fastening structure according to a first embodiment of the invention, in which FIG. 1A is a section of a nut member of the screw fastening structure, FIG. 1B, a section of the screw fastening structure, and FIG. 1C, a detail of a structure within a circle "1C" of FIG. 1B;

FIGS. 2A and 2B illustrate a fastening state of the screw fastening structure according to the first embodiment, in which FIG. 2A is a section of the screw fastening structure, and FIG. 2B, a detail of an essential portion of FIG. 2A;

FIGS. 3A and 3B illustrate a screw fastening structure according to a second embodiment of the invention, in which FIG. 3A is a section of the screw fastening structure, and FIG. 3B, a detail of a structure within a circle "3B" of FIG. 3A; and FIGS. 4A and 4B illustrate a nut member of the screw fastening structure according to the second embodiment, in which FIG. 4A is a plan of the nut member, and FIG. 4B, a detailed section of an essential portion of FIG. 4A.

DETAILED DESCRIPTION OF THE PREFERRED EMBODIMENTS

There will be detailed below the preferred embodiments of the present invention with reference to the accompanying drawings. Like elements are designated by like reference characters.

FIGS. 1A, 1B, 1C and 2A, 2B illustrate a screw fastening structure according to a first embodiment of the invention, in which an electrically conductive nut element E1 (as a female thread component) is screwed onto an electrically insulated conductive bolting element E2 (as a male thread component), which (E2) has an anti-corrosive, well adhesive, scratch-resistive and electrically non-conductive external paint layer L extending over, and is fixed in an electrically connecting manner to, an electrically conductive portion B1 of a body B of a vehicle that (B1) has a number of electrically conductive or electrostatically active unshown vehicular components attached thereto, such as a piping and a heat shield plate, and that (B1) is electrically grounded.

As shown in FIG. 1A, the nut element E1 comprises a hexagonal straight nut 1 constituted with an electrically conductive nut body 10 having a central straight hollow 10a and a female thread portion 11 tapped in a wall of the hollow 10a.

In FIGS. 1B and 1C, the nut element E1 is screwed on the bolting element E2. As shown in FIG. 1B, the bolting element E2 comprises an electrically conductive stud bolt 20 and a paint coat 23 put thereon as part of the paint layer L. The bolt 20 has a male thread portion 21 died in a cylindrical side wall, and is contacted and directly welded at a proximal end 20a thereof to the vehicle body portion B1. The male thread portion 21 is wholly covered by the paint coat 23, as the welded bolt 20 is unmasked when paint is sprayed over the vehicle body portion B1 to thereby provide the paint layer L, because a masking costs high.

As better shown in FIG. 1C, the female thread portion 11 of the nut 1 comprises a number of equally pitched spirally extending continuous screws of a female thread 12 that has in its profile a thrust bearing flank 12a (at a near side to the proximal end 20a or an upside in the figure) and an opposing flank 12b (at a far side from the proximal end 20a or a downside in the figure), and the male thread portion 21 of the bolt 20 comprises a larger number of equally pitched spirally extending continuous screws of a male thread 22 that has in its profile a thrust bearing flank 22a (at a near side to the proximal end 20a or a downside in the figure) and an opposite flank 22b (at a far side from the proximal end 20a or an upside in the figure).

When the nut 1 applied on the bolt 20 as in FIG. 1B is driven with torque (collectively to be T), the thrust bearing flanks 12a and 22a of associated screws of the female and male threads 12 and 22 exert thrust forces (collectively to be F) or pressures on each other, such that F=T/kD (where k is a condition-dependent coefficient and D is a nominal diameter of the nut 1), with the paint coat 23 intervening therebetween.

To this point, as shown in FIGS. 1C and 2B, the female thread 12 has a projection 13 provided as an electrical contact element on the thrust bearing flank 12a, substantially at a middle position between flat ridges 14 and 24 (or flat or round roots 15 and 25) of the male and female threads 12 and 22, in a substantially triangular cross-sectional form with a vertex 13a of an obtuse angle near or close to a right angle or within a preferable angle range of 90° to 120°. The projection 13 is (which, as will be understood, as has an obtuse-angle configuration) is tapped and trimmed, together with the flank 12a.

The projection 13 breaks through an intervening part of the paint coat 23 and bites into a substantially straight slope 22c of the thrust bearing flank 22a, as illustrated in FIG. 1C where the nut 1 is tightened with an increasing magnitude of torque T by virtue of a thrust source (e.g. B1+L+W in FIG. 1B) acting thereon. As a result, an exposed underside or bottom 10b of the body 10 of nut 1 is electrically connected to the conductive portion B1 of vehicle body B, via the thread 12 of female thread portion 11, the projection 13 of flank 12a, the thread 22 of male thread portion 21, a body of the bolt 20, and the end 20a of bolt 20.

As will be seen from FIG. 2B, the projection 13 spirally continuously extends along the ridge 14 of the female thread 12, with a projection dimension to be set, as a height of the vertex 13a relative to a substantially straight slope 12c of the thrust bearing flank 12a, to be smaller than a designed fitting clearance C between the female and male threads 12 and 22, but not excessively smaller than an apparent fitting clearance Ca between the nut element E1 and the bolting element E2 that (Ca) is substantially equivalent to C-t, where t is an average thickness of the paint coat 23. For example, the projection dimension may be approx. 0.05 mm, as the nominal diameter D of the nut 1 is a 8 mm.

The obtuse angle of the vertex 13a is defined between an ascendingly radially extending thrust bearing face 13b and a substantially axially extending cut-in face 13c of the projection 13, in which the thrust bearing face 13b has an ascending angle set (to be about 10° in this case) relative to a radial reference plane S, in consideration of the service life of a tap (not shown) having a special envelope form to or reverse form of the female thread 12 which includes the projection 13, and the productivity of nut 1, as well as for qualities to be secured such as of configuration, dimensions and applicability of and current conduction and defined cutting by the projection 13. If the obtuse angle is excessive (e.g. >120°), there develops an increased loss of torque T when fastening, resulting in a reduced thrust force F remaining to be effective. If that angle be under the range (e.g. <90°), there may be caused an earlier abrasion of a whetstone for the tap.

In FIG. 2A, after application of an electrically conductive flat washer or terminal W, the nut 1 is applied on the bolt 20 and traveling on a way of screw-down without significant thrust forces, where the projection 13, which has a smaller projection height to the flank 12a of female thread 12 than the fitting clearance C between the nut 1 and the stud bolt 20, is substantially free from interference with the flank 22a of male thread 22 of the bolt 20 so that the nut 1 kept from galling and seizing, while the paint coat 23 on a region of male thread screws where the nut 1 has traveled is substantially maintained (i.e. not scraped off) and permits an anti-corrosive property to be secured.

In FIG. 1B, the nut 1 is seated on the terminal W with a sufficient thrust force F produced to act thereon for strong fixation to the vehicle body B, which force F has caused the projection 13 on the flank 12a of female thread 12 to bite in the flank 22a of male thread 22, so that this flank 22a is electrically connected with that flank 12a, allowing for the nut 1 to be employed as a grounding component.

The projection 13 is formed on the thrust bearing flank 12a of the female thread 12, continuously along the ridge 14, and when the nut 1 is seated on the terminal W, it (13) has bitten in the flank 22a of male thread 22 over length of its spiral, permitting a conforming current conduction therebetween, with an enhanced grounding performance, as well as an enhanced anti-loosening performance due to the biting.

Incidentally, the straight nut body 10 is provided on the top face with a polarity identifier 50 for identifying a polarity in orientation of the projection 13, i.e. the axial end face to be up-sided when applying the nut 1 on the bolting element E2 so that the flank 12a, which is formed with the projection 13, can serve as a thrust bearing side. The polarity identifier 50 may be a rise, emboss, print or seal. A continued polarity identifier or a number of raised polarity identifiers may be arranged symmetrical about a center axis for an improved appearance or facilitated piling. A polarity identifier may be provided on a lateral side or bottom of the nut body 10.

FIGS. 3A, 3B and 4A, 4B illustrate a screw fastening structure according to a second embodiment of the invention, in which also a conductive nut element E1 is screwed onto an insulated conductive bolting element E2, which (E2) also comprises: a stud bolt 20 formed with a male thread portion 21 (as screws of a male thread 22) and fixed by a welding 20a to a grounded conductive portion B1 of a vehicle body B; and an external coating layer L of a vehicular paint P including a paint coat 23 covering the stud bolt 20.

In the second embodiment, however, the nut element E1 comprises an electrically conductive flanged hexagonal nut 3 constituted, as shown in FIG. 4A: with a hexagonal nut portion 30 having a female thread portion 31 (composed, as in FIG. 3B, of screws of a female thread 32 that is identical to the female thread 12 of the first embodiment and formed with a projection 33 at a middle position between associated thread ridges 34, 24 or thread roots 35, 25) and a circular bottom flange 39 which provides an increased area for thrust collection and concurrently serves as a polarity identifier; and with three paint removing straight grooves 36 formed (with a tangential open width H of about 2 mm between a radial line L1 and a paralleled line L2 as in FIG. 4B [although the line L2 may also be a radial.]) along height of the nut 3 (thus crossing the female thread portion 31 and interrupting each screw of the female thread 32) and arranged symmetrical at angular intervals of approx. 120° about a center axis of the nut 3.

As best shown in FIG. 4B, each paint removing groove 36 is defined in plan by a straight side wall 36a (at a backward end of a screw-in direction or tightening torque T) and an outwardly curved continuous side wall 36b (at a forward end of the screw-in direction). As a respective screw of the female thread 32 is divided by the three grooves 36 into three screw segments 37 thereof, the straight or curved side walls 36a and 36b of respective groove 36 each have (as in FIG. 3B) a straight downstream or curved upstream end face of an associated thread screw segment 37, including a straight or curved triangular end face of an associated screw segment 37a of the projection 33. At a downstream of the associated screw segment 37a, an obtuse-angled edge of the straight end face cuts part of the paint coat 23 to be removed and bites in a flank of the male thread 22, as the nut 3 is screwed to produce a sufficient thrust force.

The straight side wall 36a of each groove 36 is inclined downstream (i.e. in a forward sense), relative to the radial line L1, at an angle A of about 10°, having edge points 36c and 36d meeting the ridge 34 and the root 35 of the female thread 32, respectively, and radially extends to have a radially outer end 36e outside the thread 32. The curved side wall 36b continuously extends upstream (i.e. in a backward sense), having edge points 36f and 36g meeting the ridge 34 and the root 35 of the female thread 32, respectively, joining at its upstream end with the outer end 36e of the straight side wall 36a, defining a paint removing space 38 outside a mating portion of the male thread 22.

The outer end 36e of the straight side wall 36a may preferably be located on or near the root 35 of the male thread 32.

The nut 3, which has the paint removing groove 36 crossing the male thread portion 31, is adapted to peel and curl away an extra thickness of paint P when the paint coat 23 on the male thread portion 21 has an excessive thickness, and can be kept from galling or seizing on a way before seating, in addition to that the straight side wall 36a inclined in a forward sense and the curved side wall 36b of the paint removing groove 36 cooperate with each other to permit an enhanced performance for removal of extra paint P, with a maintained rake-out function under a slight reduced but still sufficient strength of the structure, thereby allowing for the nut 3 to be the more free from gall and seizure.

In this respect, seven samples ① to ⑦ each constituted as the nut 3 were subjected to a screw-in test for an inspection of screw-up torque (to a criterion of 50 kg·cm or less) up to a seating and for a grounding nature in a seating state, to have results listed in Table-1 below. For the grounding nature, given results are after decision by visual inspection for a contact (criterion: to be a metal touch) between a thrust bearing flank of a female thread 32 of nut 3 and an exposed region of a thrust bearing flank of a male thread 22 of a welded bolt 20, as this flank was covered with a 20 μ cation paint coat.

As will be seen from the Table-1, the samples ① to ⑦ were all under the criterion limit of 50 kg·cm in screw-in torque, with a proof of no need for a significant magnitude of torque before a seating of nut 3, in addition to a proven adaptivity for application of nut 3 to a grounding.

TABLE 1

| Smpl | Criteria | Screw-in torque, kg-cm | Grounding nature |
|---|---|---|---|
| ① | ≦50 kg-cm, metal touch | 3 | Conforming |
| ② | do. | 4 | do. |
| ③ | do. | 7 | do. |
| ④ | do. | 4 | do. |
| ⑤ | do. | 5 | do. |
| ⑥ | do. | 6 | do. |
| ⑦ | do. | 4 | do. |

It will be seen that in the foregoing embodiments the nut element E1 and the bolting element E2 may comprise other types of nut and coated bolt, respectively.

The contents of Japanese Patent Application No. 10-129926 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A screw fastening structure comprising:
   a conductive male thread having a first flank covered with an insulating paint coat;
   a conductive female thread having a second flank; and
   an electric contact electrically interconnecting the first and second flanks through the paint coat, the electric contact comprising a conductive projection integrally formed on the second flank and configured to cut through the paint coat, as the male and female threads are screwed.

2. The screw fastening structure of claim 1, wherein the conductive projection is configured to bite in the first flank to electrically interconnect the first and second flanks, as the male and female threads are screwed, producing a thrust force acting between the first and second flanks, with the paint coat intervening therebetween.

3. The screw fastening structure of claim 1, wherein the second flank constitutes a thrust bearing flank of the female thread.

4. The screw fastening structure of claim 1, wherein the projection has, relative to the second flank, a smaller height than a fitting clearance between the male and female threads.

5. The screw fastening structure of claim 1, wherein the projection has a triangular sectional form.

6. The screw fastening structure of claim 1, wherein the projection has a vertex of an obtuse angle.

7. An electric circuit comprising a screw fastening structure according to claim 1.

8. A vehicular grounding circuit comprising an electric circuit according to claim 7.

9. The screw fastening structure of claim 1, comprising:
   a plurality of screws of the male thread;
   a plurality of screws of the female thread; and
   a plurality of screws of the projection.

10. The screw fastening structure of claim 9, wherein a screw of the projection extends in parallel with a screw of a ridge of the female thread.

11. The screw fastening structure of claim 9, wherein further comprising a paint removing groove interrupting a number of screws of the female thread and a number of screws of the projection.

12. The screw fastening structure of claim 11, wherein the paint removing groove has a side wall inclined downstream of a screw of the female thread.

13. The screw fastening structure of claim 12, wherein the paint removing groove has another side wall curved to extend upstream of the screw of the female thread.

14. The screw fastening structure of claim 9, comprising:
   a bolt member formed with the plurality of screws of the male thread covered with an insulating paint layer containing the paint coat; and
   a nut member formed with the plurality of screws of the female thread and the plurality of screws of the projection.

15. A screw fastening structure comprising:
   a conductive male thread having a first flank wholly coated with an insulating paint layer;
   a conductive female thread having a second flank; and
   an electric contact electrically interconnecting the first and second flanks through the paint coat, the electric contact comprising conductive projection means integrally formed on the second flank for cutting through the paint layer, as the male and female threads are screwed.

* * * * *